US010558627B2

United States Patent
Cassidy et al.

(10) Patent No.: US 10,558,627 B2
(45) Date of Patent: Feb. 11, 2020

(54) METHOD AND SYSTEM FOR CLEANSING AND DE-DUPLICATING DATA

(71) Applicant: LeanTaas, Inc., Santa Clara, CA (US)

(72) Inventors: Hugh Cassidy, Campbell, CA (US); Sofia DeMarco, Mountain View, CA (US); Jayant Lakshmikanthan, San Jose, CA (US)

(73) Assignee: LeanTaas, Inc., Santa Clara, CA (US)

(*) Notice: Subject to any disclaimer, the term of this patent is extended or adjusted under 35 U.S.C. 154(b) by 219 days.

(21) Appl. No.: 15/488,388

(22) Filed: Apr. 14, 2017

(65) Prior Publication Data
US 2017/0308557 A1 Oct. 26, 2017

Related U.S. Application Data

(60) Provisional application No. 62/325,968, filed on Apr. 21, 2016.

(51) Int. Cl.
| | |
|---|---|
| *G06F 16/215* | (2019.01) |
| *G06F 12/02* | (2006.01) |
| *G06N 20/00* | (2019.01) |
| *G06F 16/2455* | (2019.01) |

(52) U.S. Cl.
CPC ........ *G06F 16/215* (2019.01); *G06F 12/0253* (2013.01); *G06F 16/24556* (2019.01); *G06N 20/00* (2019.01)

(58) Field of Classification Search
CPC ............. G06F 16/215; G06F 16/24556; G06F 12/0253; G06N 20/00
See application file for complete search history.

(56) References Cited

U.S. PATENT DOCUMENTS

| | | | | |
|---|---|---|---|---|
| 6,961,721 | B2 * | 11/2005 | Chaudhuri | ............ G06F 16/215 |
| 7,672,942 | B2 * | 3/2010 | Weinberg | .......... G06F 16/24556 |
| | | | | 707/999.006 |
| 8,688,603 | B1 * | 4/2014 | Kurup | .................... G06N 20/00 |
| | | | | 706/13 |
| 8,793,201 | B1 * | 7/2014 | Wang | .................... G06F 16/258 |
| | | | | 706/13 |
| 8,914,366 | B1 * | 12/2014 | Li | ........................ G06K 9/6218 |
| | | | | 707/737 |
| 9,471,609 | B2 | 10/2016 | Kienzle | |
| | | | (Continued) | |

*Primary Examiner* — James E Richardson
(74) *Attorney, Agent, or Firm* — Fenwick & West LLP

(57) ABSTRACT

Method and system for cleansing and de-duplicating data in database are provided. The method includes filtering garbage records from a plurality of records based on data fields, and applying cleansing rules to create a cleansed database. A similarity vector is generated, where each vector corresponds to pairwise comparison of distinct data entries in cleansed database. Matching rules are applied to label each vector as one of matched, unmatched and unclassified. The method analyzes the vectors labeled as matched and unmatched to train a machine learning model to identify duplicates in the cleansed database. Unclassified vectors in the cleansed database are labeled as matched or unmatched by applying machine learning model on unclassified vectors. Thereafter, the method processes all the vectors labeled as matched to create clusters of records that are duplicates of each other. Further, records in each cluster are merged to obtain de-duplicated cleansed database using predefined consolidated rules.

16 Claims, 6 Drawing Sheets

(56) References Cited

U.S. PATENT DOCUMENTS

| | | | |
|---|---|---|---|
| 2004/0107203 A1* | 6/2004 | Burdick | G06F 16/20 |
| 2004/0158562 A1* | 8/2004 | Caulfield | G06F 16/215 |
| 2009/0245573 A1* | 10/2009 | Saptharishi | G06K 9/00771 |
| | | | 382/103 |
| 2013/0054541 A1* | 2/2013 | Kaldas | G06F 16/215 |
| | | | 707/692 |
| 2013/0238623 A1* | 9/2013 | Wyllie | G06F 16/215 |
| | | | 707/737 |
| 2015/0269494 A1* | 9/2015 | Kardes | G06F 16/285 |
| | | | 706/12 |
| 2016/0092494 A1 | 3/2016 | Kabra et al. | |
| 2016/0180245 A1* | 6/2016 | Tereshkov | G06F 16/25 |
| | | | 706/12 |
| 2017/0083825 A1* | 3/2017 | Battersby | G06N 20/00 |
| 2017/0242891 A1* | 8/2017 | Doan | G06F 7/32 |
| 2019/0080247 A1* | 3/2019 | Dubey | G06F 16/215 |

* cited by examiner

METHOD AND SYSTEM FOR CLEANSING AND DE-DUPLICATING DATA

TECHNICAL FIELD

The present invention generally relates to managing of data in a database and, more particularly to a method and system for cleansing and de-duplicating data in the database.

BACKGROUND

Management and storage of data is one of the most important needs for all types of organizations or companies (e.g., large or small companies, commercial entities, non-profit organizations, government entities or any similar entities). There can be numerous types of data for example including, but not limited to, customer data, vendor data and employee data, and administrative data. The data is gathered from a variety of different data sources and is electronically stored in various formats as records in databases. Examples of data sources may include, but are not limited to, employee database, sales database, contact center database, offline records, customer escalation records, company's social media followers records, customer query records and mailing lists records.

Each record from these data sources may contain different information about customers and the information may be in different formats. For example, data gathered from the mailing lists may include email addresses of customers along with their names. Similarly, data gathered from the social media profiles may include customer names and information related to social media. The information gathered from different sources may be in different formats as each data source is pre-customized to receive information in different formats. Moreover, the customer may also use different information associated with them for different sources. For example, the name of a customer on a social media profile could be slightly different than on the mailing list.

There may be instances when different records in the company may correspond to a same customer/entity, thereby creating multiple records for the same customer in the database. This issue aggravates if the records are entered in a free text format in the database. The free text format allows different information to be entered in different fields of the records without any limitations and checks. Thus, the records may include redundant data, incorrect values or inconsistent values. Some other issues encountered while entering free text data may include missing data, incorrect spellings, usage of abbreviations and short forms, formatting issues, synonyms used, and the like. Because of these issues and errors, multiple records may inadvertently be created for a same entity/customer.

Over time, as data entry and merging of records from different sources occur, duplicate copies may begin to creep into the database. Such occurrence of duplicate copies is referred to as data duplication. Storing duplicate data in a database is inefficient for several reasons, for example, duplicate data could make pricing analysis almost impossible, duplicate vendor data could make any vendor rationalization difficult, duplicate data may lead to memory constraints, and the like. Therefore, identifying and eliminating duplicate data is one of the major problems in the area of data cleaning and data quality. Several approaches have been implemented to counter the problem of data duplication. However, none of the approaches are effective specifically in large-scales.

SUMMARY

Various methods, systems and computer readable mediums for cleansing and de-duplicating data in a database disclosed. In an embodiment, a computer implemented method for cleansing and de-duplicating data in a database is disclosed. The computer-implemented method includes filtering unnecessary records from a plurality of records in the database based on data fields. A cleansed database is then created by applying cleansing rules to remove the unnecessary records. The computer-implemented method then generates similarity vectors, wherein each vector corresponds to a pairwise comparison of distinct data entries in the cleansed database. Further, matching rules are applied to find matched data and unmatched data in the cleansed database for labeling each vector in the similarity vectors as one of matched, unmatched and unclassified. The computer-implemented method thereafter analyses the vectors labeled as matched and unmatched to train a machine learning model to identify duplicates in the cleansed database. The unclassified vectors in the cleansed database are then labeled as matched or unmatched by applying the machine learning model. The computer-implemented method then processes all the vectors labeled as match to create clusters of records that are duplicates of each other in the cleansed database. Further, the records in each cluster are merged to obtain a de-duplicated cleansed database using predefined consolidated rules.

In another embodiment, a system for cleansing and de-duplication of data is disclosed. The system includes a memory and a processor. The memory stores instructions for cleansing and de-duplicating data. The processor is operatively coupled with the memory to fetch instructions from the memory for cleansing and de-duplicating data. The processor is configured to filter unnecessary records from a plurality of records in the database based on data fields. The processor then creates a cleansed database by applying cleansing rules to remove the unnecessary records. Thereafter, the processor generates similarity vectors, wherein each vector corresponds to a pairwise comparison of distinct data entries in the cleansed database. The processor further applies matching rules to find matched data and unmatched data in the cleansed database for labeling each vector in the similarity vectors as one of matched, unmatched and unclassified. The processor also analyses the vectors labeled as matched and unmatched to train a machine learning model to identify duplicates in the cleansed database. The unclassified vectors are then labeled by the processor as matched or unmatched by applying the machine learning model. Further, all the vectors labeled as match are processed by the processor to create clusters of records that are duplicates of each other in the cleansed database. Subsequently, the processor merges records in each cluster to obtain a de-duplicated cleansed database using predefined consolidated rules.

In yet another embodiment, a computer system for cleansing and de-duplication of data is disclosed. The computer system includes a processor and an application program. The application program is executed by the processor. The application program filters unnecessary records from a plurality of records based on data fields. A cleansed database is then created by applying cleansing rules to remove the unnecessary records. The application program then generates similarity vectors, wherein each vector corresponds to a pairwise comparison of distinct data entries in the cleansed database. Further, matching rules are applied to find matched data and unmatched data in the cleansed database for labeling each vector in the similarity vectors as one of matched, unmatched and unclassified. The application program thereafter analyses the vectors labeled as matched and unmatched to train a machine learning model to identify duplicates in the cleansed database. The unclassified vectors are then labeled in the cleansed database as matched or unmatched by applying the machine learning model on the unclassified vectors. All the vectors labeled as match is then processed by the application program to create clusters of records that are duplicates of each other in the cleansed database. Subsequently, the application program merges the records in each cluster obtain a de-duplicated cleansed database using predefined consolidated rules.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only example in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term data used throughout the description represents a plurality of records stored in a database. Further, a machine learning algorithm is used to build a machine learning model which is then to classify vectors in the proposed method. Herein, unless the context suggests otherwise, the terms 'machine learning algorithm' and 'machine learning model' are used interchangeably for the purposes of this description.

Figure 1:
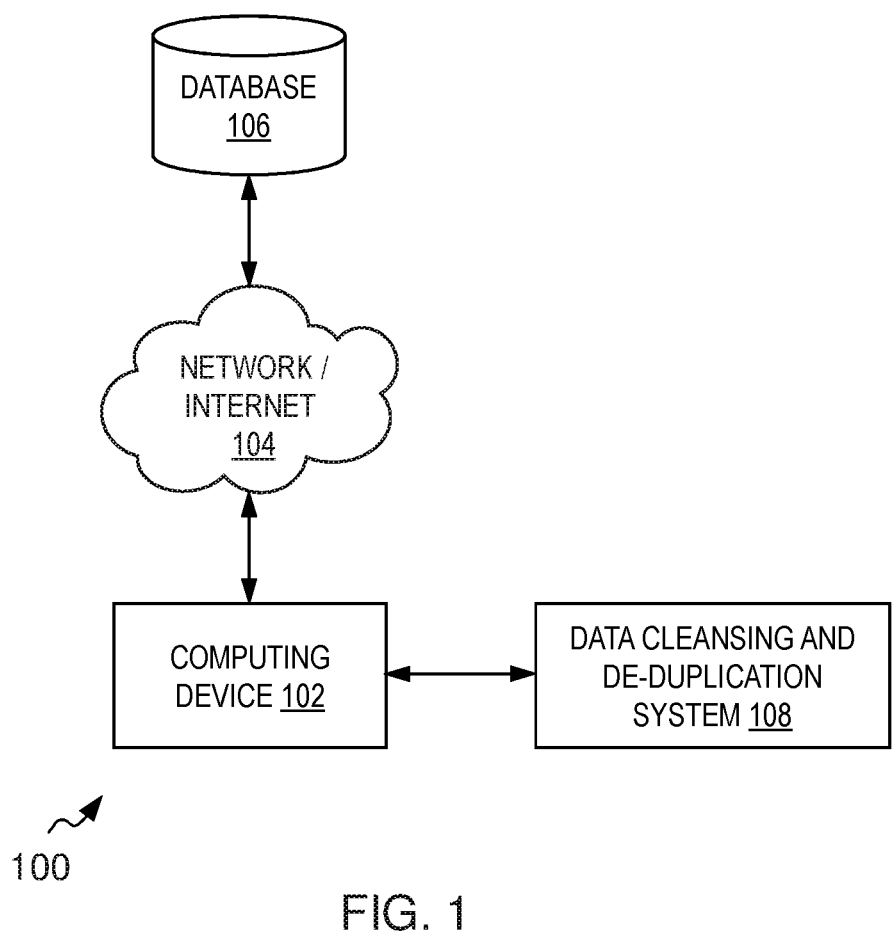
FIG. 1 illustrates a schematic representation of an example environment 100, where at least some example embodiments of the present invention can be implemented.

FIG. 1 illustrates a schematic representation of an example environment 100, where at least some example embodiments of the present invention can be implemented. The environment 100 includes a computing device 102, a network 104 and a database 106.

The computing device 102 is a portable electronic or a desktop device configured with a user interface (not shown in FIG. 1) to interact with a user of the computing device 102. Examples of the computing device 102 include, but are not limited to, a personal computer (PC), a mobile phone, a tablet device, a personal digital assistant (PDA), a smart phone and a laptop. Examples of the user interface include, but are not limited to, display screen, keyboard, mouse, light pen, appearance of a desktop, illuminated characters and help messages.

The computing device 102 is also associated with a data cleansing and de-duplication system 108. The data cleansing and de-duplication system 108 is configured with a non-transitory computer-readable medium (referred as "Prime software"), the content of which causes to perform the method disclosed herein. For the sake of clarity and for the purpose of this description the "prime software" is referred as software. Typically, the software uses a combination of user-defined rules and machine learning algorithms to traverse multiple combinations of records rapidly to cleanse and isolate potential duplicates in the database 106.

The data cleansing and de-duplication system 108 which includes the software, comprising the invention, may be directly associated with the computing device 102. In an embodiment, the data cleansing and de-duplication system 108 is associated with different computing devices (not shown in FIG. 1) and may be accessible by the computing device 102 over the network 104. In another embodiment, the data cleansing and de-duplication system 108 may be associated with one or more servers (not shown in FIG. 1) and is accessible by the computing device 102 over the network 104.

The network 104 is a group of points or nodes connected by communication paths. The communication paths may be connected by wires, or they may be wirelessly connected or may use any such combination. The network 104 as defined herein can interconnect with other networks and may contain subnetworks. Examples of the network 104 includes, but are not limited to, a local area network (LAN), a personal area network (PAN), a metropolitan area network (MAN), and a wide area network (WAN).

The data cleansing and de-duplication system 108 may include a plurality of modules for performing different steps and functions associated with cleansing and de-duplicating data. The plurality of modules is explained in conjunction with FIG. 2. In an embodiment, the steps and function performed by different modules may be combined into a single module, or into other combinations of modules.

In the environment 100, the computing device 102 is associated with the database 106 through the network 104. In an embodiment, the database 106 may be directly associated with the computing device 102. The database 106 is configured to store data after cleansing and de-duplication. In an embodiment, the database 106 also stores data that includes garbage and duplicated data. In the embodiment, the data contains a plurality of records that are duplicates and may include garbage data.

In the environment 100, the data, including the garbage data and duplicate records, is first diagnosed to extract fields that can be used to filter out unwanted and unnecessary records (also referred as 'junk' or 'garbage records'). In an embodiment, a unique identity, for example a signature, is created to be assigned to each record. The garbage records and values are removed from the database 106 with the aid of cleansing rules. Consequently, a cleansed database that is ready for de-duplication is obtained.

Rules are then applied to the data in the cleansed database to identify matches and non-matches. This will help train a machine learning model to identify patterns in the data. The trained machine learning model then extracts patterns and identifies duplicates in the entire data. Pair-wise comparisons are made in the cleansed data to label the pairs as a match or a non-match. All match-pairs are then processed to create clusters. The clusters are then merged using pre-defined consolidated rules. The merged records could reside in the database 106, in an external database or in other source systems.

It should be appreciated by those of ordinary skill in the art that FIG. 1 depicts the computing device in an oversimplified manner and a practical embodiment may include additional components and suitably configured processing logic to support known or conventional operating features that are not described in detail herein.

System Modules

Figure 2:
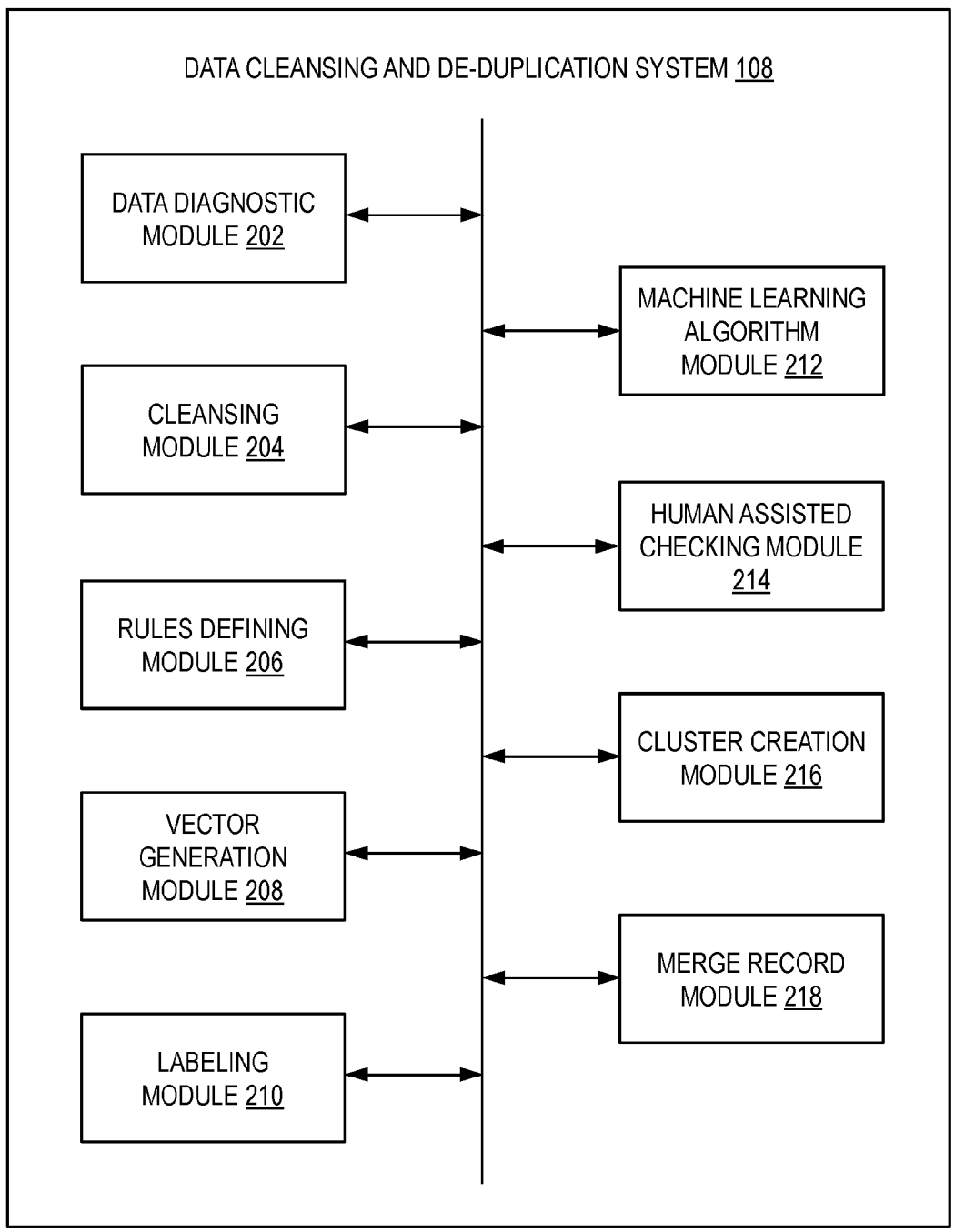
FIG. 2 illustrates a block diagram depicting different modules included in a data cleansing and de-duplication system, in accordance with an example embodiment.

FIG. 2 illustrates a block diagram depicting different modules included in a data cleansing and de-duplication system 108, in accordance with an example embodiment. The data cleansing and de-duplication system 108 includes a data diagnostic module 202, a cleansing module 204, a rules defining module 206, a vector generation module 208, a labeling module 210, a machine learning algorithm module 212, a human assisted checking module 214, a cluster creation module 216 and a merge record module 218. Though the data cleansing and de-duplication system 108 is shown to include nine modules, it should be apparent to the person skilled in the art, that data cleansing and de-duplication system 108 may include more or less number of modules to perform the invention. Further, the steps and function performed by different modules may be combined into a single module, or into other combinations of modules.

The data diagnostic module 202 performs an exploratory step in which data included in the database 106 is profiled in excruciating detail. The profiling of data is used to extract fields that can be used to filter out unnecessary (also known as 'garbage') records. Examples of garbage records may include records that contain dummy business names, addresses or phone numbers. Additionally, the records which include exact duplication across multiple fields are also indicative of garbage. In an embodiment, a unique identity, for example a signature, is created for each record. In an embodiment, identifying garbage field is a result of a pre-defined training exercise.

The profiling of data relates to analysis of data with respect to statistical properties of data distribution, format of data, quality of data, and the like. The profiling of data can provide information regarding valid addresses, missing fields and can also be used to identify problems associated with stored data like wrong values in the fields. In an embodiment, the profiling of data may include pattern analysis for determining whether or not data values in different field match expected patterns. In an embodiment, the profiling of data may also determine whether or not specific data values are acceptable in a particular field. For example, data in the 'age' field may only accept numbers and other data values like characters are unacceptable. Once the data diagnostic is performed by the data diagnostic module 202, the data is cleansed by the cleansing module 204.

The cleansing module 204 standardizes the data included in the database (say the database 106). For example, all fields in the data are converted to upper case or lower case, special characters is removed, fields such as phone and zip code are standardized based on geographical location or address, and the like. Thereafter, fields that are not useful for de-duplication are discarded. For example, comments sections field could be discarded. Once, the data is standardized, the garbage records and values are removed based on cleansing rules which may be defined based on the steps performed by the data diagnostic module 202.

In an embodiment, the data is standardized so that different records could be comparable with each other in the standardized format. The data standardization is vital step while managing free text format data. For example, phone numbers associated with different people could be written in different format like '(+county code)(area code)(number)', '(area code) (number)', '(area code)-(number)'. In another example, a name field could be written in different formats like 'first name' followed by 'last name' or 'last name' followed by 'first name'. Once the data is cleansed by the cleansing module 204, rules are defined to find the records that are duplicates.

The rules defining module 206 is used to define rules which will be used to identify matches and non-matches in the database 106. In an embodiment, user inputs and/or machine learning algorithm could be used to define rules. The user inputs will act as training for the machine learning algorithm to create more such rules. The matches, based on these rules, could be termed as 'close match', 'exact match', 'non-match' and the like. The 'close match' can be the records which are not the exact match but could be inferred as 'match' based on analysis. An example is a scenario while comparing the address field of two records, if address in one record includes additional information such as 'suite number', while all the other address data are same, then it could be considered a 'close match'. The defining of rules is further explained with following examples:

A pair of record is a 'match', if:
  ('Business name' is a close match) AND ('street address' is a close match) AND (phone number is an exact match) AND ('email address' is a close match).

Similarly, a pair of record is a non-match, if:
  ('business name' is not at least a close match) AND ('zip code' is not at least a close match) AND (state is not at least a close match).

Similarly, multiple rules could be defined in the rules defining module 206. Once the rules are defined and the data is cleansed, set of similarity vectors are generated using the vector generation module 208.

The vector generation module 208 generates multiple sets of similarity vectors. In an embodiment, the similarity vectors are generated using one or more string matching algorithms. One non limiting example of string matching algorithm is Jaro-Winkler string matching algorithm. Each vector corresponds to a pairwise comparison of two distinct records. Each vector has as many components as there are fields in the cleansed data set. For example, if the records 'i' and 'j' are being compared then '$k^{th}$' component of the similarity vector (wherein i, j and k are numeric values) gives the string similarity score for the strings in field 'k' of records 'i' and 'j'. In an embodiment, a similarity score of 1 indicates an exact match and a score of 0 indicates non-match (complete dissimilarity). In an embodiment, a score between '0.85' and '0.99' is considered to be a close match.

In an embodiment, the comparisons are performed 'pairwise', therefore two corresponding fields of two different records are compared to each other and similar comparison is performed between all the records. Further, the matching scores may be numeric (as explained above) or Boolean. In an embodiment, different matching methods could be applied for text (non-numeric) fields, alpha numeric, and numeric fields. The different matching methods may include, but are not limited to, vector spacing method, distance metric method, absolute or relative difference methods, and the like. Post generation of similarity vectors, the similarity vectors are labeled by the labeling module 210.

The Labeling module 210 labels the generated vectors. Once the similarity vectors have been generated and the set of match and non-match rules have been defined, the rules may be applied on the similarity vectors. As a result, different vectors will be labeled as a 'match', or an 'unmatched' (or non-matched'). In an embodiment, there may be plurality of vectors that are not labeled. Thereafter, the labeled vectors are analyzed in the machine learning algorithm module 212.

The machine learning algorithm module 212 analyses the labeled vector and classifies the remaining non labeled vector. The set of labeled vectors is used as a training and test set for a machine learning model for classification of unlabeled vector. An example of machine learning algorithm is an adaptive boosting algorithm. In an embodiment, the machine learning algorithm module 212 classifies the remaining vectors and returns a confidence level with each label. The labeled vectors are then checked by users using the human assisted checking module 214.

The human assisted checking module 214 allows users to review pairs for which the labeling could not be done with assurance and the confidence score is not sufficient to mark them as match or non-match. In an embodiment, if the confidence scores of any pair are outside a predefined threshold and a human/manual judgment are needed, then the pairwise comparison of those are analyzed by the user. In an embodiment, the pairwise comparisons are presented to the user using an easy-to-use interface and the user may label each pair as a match or a non-match. The cluster creation module 216 then analyzes the match-pairs to create clusters.

The cluster creation module 216 processes all match-pairs and thereafter creates clusters. Master records are identified using defined rules. For example, the most complete record may be considered as the master record in each cluster. In cases, where it's not clear which record is a master record, then users may get an option to select the master record. For example, if a record '1' is a duplicate of record '3978' and the record '3978' is a duplicate of record '136981' then the records '1', '3978' and '136981' are created as a cluster. Further, if the record '3978' is most complete amongst records the records '1', '3978' and '136981', then the record '3978' is marked as master record. Similarly, all the clusters are created.

The merge record module 218 then merges the clusters. In an embodiment, the merged record resides in an external database. In another embodiment, the merged record could reside at a source system, for example the computing device 102. For example, if a record '1' is a duplicate of record '3978' and record '3978' is a duplicate of record '136981' then the records '1', '3978' and '136981' are created as a cluster. Thereafter, if the record '3978' is marked as master record then other records are removed and only record '3978' is maintained.

Process Flow

Figure 3:
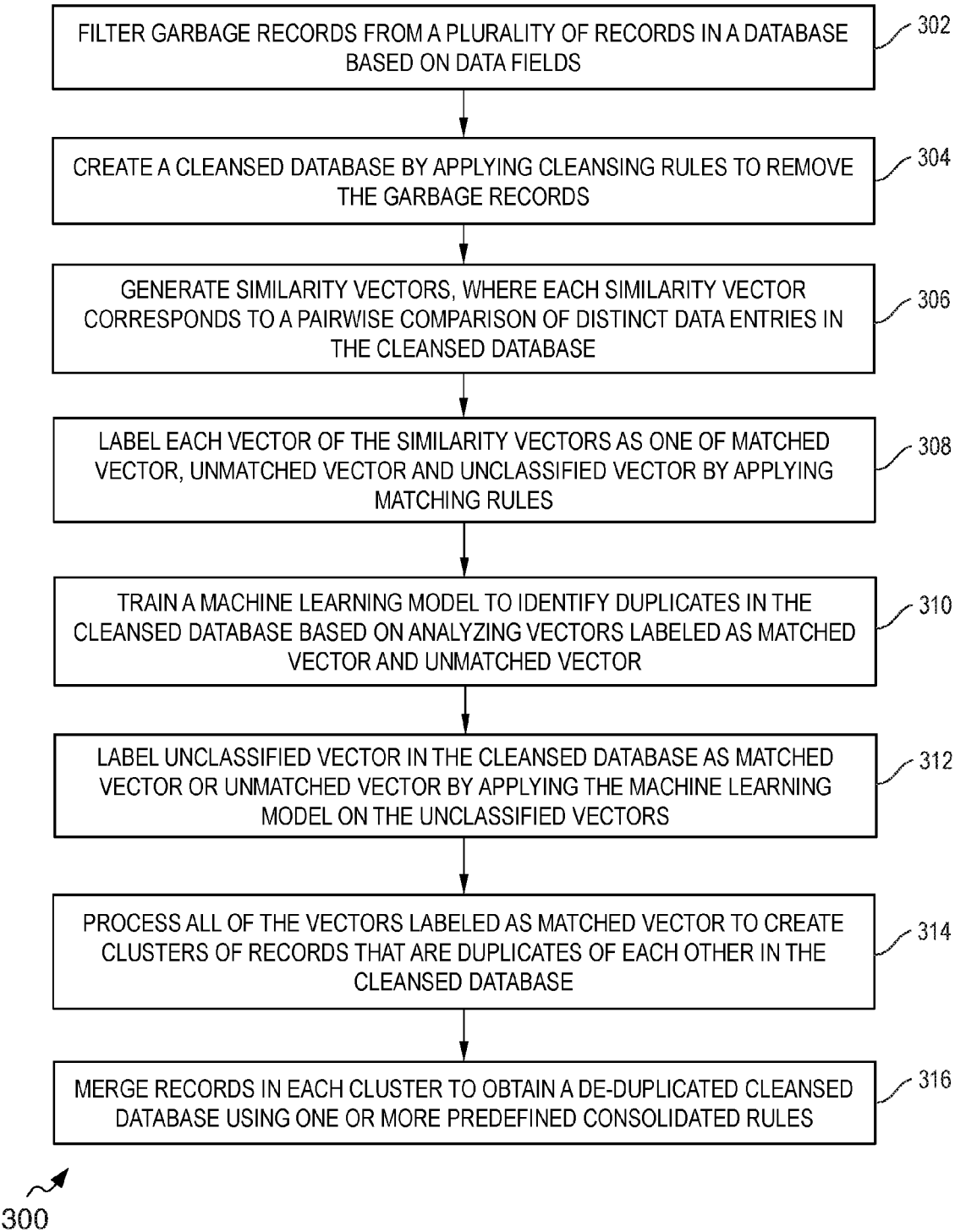
FIG. 3 is a flow chart describing a method for cleansing and de-duplicating data, in accordance with an example embodiment.

FIG. 3 is a flow chart describing a method for cleansing and de-duplicating data, in accordance with an embodiment of the present invention. The method begins at operation 302. At operation 302, garbage records are filtered from a plurality of records in the database 106 based on data fields. In an embodiment, the data included in the database 106 is profiled in excruciating detail prior to the operation 302. The profiling of data is used to extract fields that can be used to filter out garbage records. Examples of garbage records may include records that contain dummy business names, addresses or phone numbers. In an embodiment, a unique identity, for example a signature, is created for each record.

At operation 304, a cleansed database is created by applying cleansing rules to remove the garbage or unnecessary records. In this step, the data in the database is standardized. For example, standardizing of data may include converting data in all fields of the database to upper case or lower case, removing special characters from the data, arranging the data in a predefined pattern, replacing abbreviations with expanded data, adding of data in the data fields, or removing of data from the fields. Thereafter, fields that are not useful for de-duplication are discarded. For example, comments section field, salutation field, could be discarded. Once, the data is standardized, the garbage records and values are removed based on cleansing rules.

At operation 306, similarity vectors are generated, wherein each vector corresponds to a pairwise comparison of distinct data entries in the cleansed database. In an embodiment, the similarity vectors are generated using one or more string matching algorithms An example of string matching algorithm is Jaro-Winkler string matching algorithm. In an embodiment, each vector has as many components as there are fields in the cleansed data set. For example, if the records 'i' and 'j' are being compared then '$k^{th}$' component of the similarity vector (wherein i, j and k are numeric values) gives the string similarity score for the strings in field 'k' of records 'i' and 'j'. In an embodiment, a similarity score of 1 indicates an exact match and a score of 0 indicates non-match (complete dissimilarity). A score between "0.85" and "0.99" is considered to be a close match.

At operation 308, user defined matching rules are applied to find matched data and non-matched (or unmatched) data in the cleansed database for labeling each vector in the similarity vectors as one of matched vector, unmatched vector and unclassified vector. The matching rules are used to identify matches and non-matches in the database. In an embodiment, the user defined rules will be used to label records. The labeled records are used as a training set for the machine learning algorithm. The machine learning algorithm identifies patterns in the data that characterize duplicate pairs of records. The matches, based on these rules, could be termed as 'close match', 'exact match', 'non-match' and the like. The fields marked as 'close match' are the records which are not the exact match but could be inferred as same on analysis.

Once the set of match and non-match rules have been defined, the rules may be applied on the similarity vectors identified at step 306. As a result, different vectors will be labeled as a 'matched', or an 'unmatched'. In an embodiment, there may be plurality of vectors which are not labeled. In an embodiment, a machine learning algorithm is used to build a machine learning model. The machine learning model is then used to classify vectors.

At operation 310, the vectors labeled as 'matched' and 'unmatched' are analyzed to train a machine learning model to identify duplicates in the cleansed database. The machine learning model analyses the labeled vector and classifies the remaining vectors that are not labeled. The set of labeled vectors is used as training and test sets for the machine learning model for classification of the non-labeled vector. Hence, the machine learning model may then be used to classify the remaining vectors (unclassified vectors) and returns a confidence level with each label. At operation 312, the unclassified vector in the cleansed database is labeled as matched or unmatched (together with the associated confidence score) by applying the machine learning model.

At step 314, all the vectors labeled as match are processed to create clusters of records that are duplicates of each other in the cleansed database. In an embodiment, a master record is identified from the cluster of records using defined rules. For example, the most complete record may be considered as the master record or the record which is created latest or earliest could be considered as master record. In an embodiment, users may select the master record in cases where it is not clear which record is a master record. For example, if a record '1' is a duplicate of record '50' and record '50' is a duplicate of record '500', then the records '1', '50' and '500' are created as a cluster. Thereafter, if the record '50' is most complete, then the record 50 is marked as master record. Similarly, all the clusters are created and one of the records from them is marked as master record for each cluster.

At step 316, the records in each cluster are merged to obtain a de-duplicated cleansed database using predefined consolidated rules. For example, if a record '1' is a duplicate of record '50' and record '50' is a duplicate of record '500' then the records '1', '50' and '500' are created as a cluster. Thereafter, if the record '50' is marked as master record then other records are removed, and only the record '50' is maintained in the database. In an embodiment, the merged record resides in an external database. In another embodiment, the merged record could reside at the source system, for example the computing device 102.

It would be appreciated to those skilled in the art that the method described herein may be used for both one-time cleansing and recurring cleansing. The method ends at step 316.

It should further be appreciated that some operations of the method 300 may have one or more sub-operations. Also, some operations may be performed as a single operation. Furthermore, the order of performing operations of the method 300 may also be changed that what is described with reference to FIG. 3.

System

Figure 4:
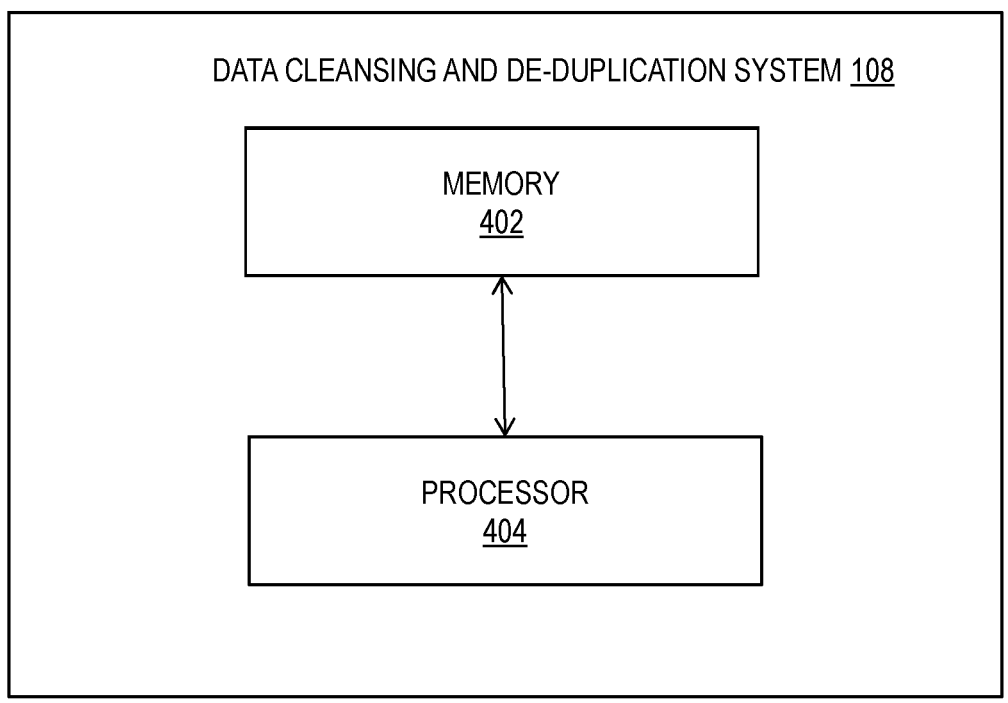
FIG. 4 illustrates a block diagram of a data cleansing and de-duplicating system, in accordance with an example embodiment.

FIG. 4 illustrates a block diagram of a data cleansing and de-duplicating system, in accordance with an example embodiment. The system includes a memory 402 and a processor 404. The memory 402 stores instructions for cleansing and de-duplicating data. The processor 404 is operatively coupled with the memory 402 to fetch instructions from the memory 402 for cleansing and de-duplicating data. The processor 404 is configured to filter garbage records from a plurality of records in the database 106 based on data fields. In an embodiment, the processor 404 extracts the data fields based on profile of data sets in the database 106. The profile of data sets includes at least one of statistical properties of data, format of data, quality of data, quantity of data, and data pattern.

The processor 404 is configured to create a cleansed database by applying cleansing rules to remove the garbage records. Examples of the unnecessary records include garbage records, duplicate records, non-useful records, and the like. In an embodiment, the processor 404 standardizes data in the data fields in a predefined format. The standardizing of data includes performing at least one of converting the data to upper case, converting the data to lower case, removing special characters from the data, arranging the data in a predefined pattern, replacing abbreviations with expanded data, adding of data in the data fields, and removing of data from the data fields.

The processor 404 then generates similarity vectors, wherein each vector corresponds to a pairwise comparison of distinct data entries in the cleansed database. In an embodiment, the processor 404 identifies a matching/comparison score for each component of each similarity vector based on a predefined scoring algorithm. In an embodiment, the similarity score for each vector component is generated using a Jaro-Winkler string matching algorithm.

The processor 404 further applies matching rules to find matched data and unmatched data in the cleansed database for labeling each vector in the similarity vectors as one of matched, unmatched and unclassified. Thereafter, the processor 404 analyses the vectors labeled as matched and unmatched to train a machine learning model to identify duplicates in the cleansed database.

The unclassified vectors are then labeled by the processor 404, as matched or unmatched, by applying the machine learning model on the unclassified vectors. Further, all the vectors labeled as match are processed by the processor 404 to create clusters of records that are duplicates of each other in the cleansed database. In an embodiment, the processor 404 identifies a master record in each cluster of records. Subsequently, the processor 404 merges records in each cluster to obtain a de-duplicated cleansed database using predefined consolidated rules. In an embodiment, the merging of records is done based on the master record. In an embodiment, the merged records are then stored in an external database.

EXAMPLE

Figure 5:
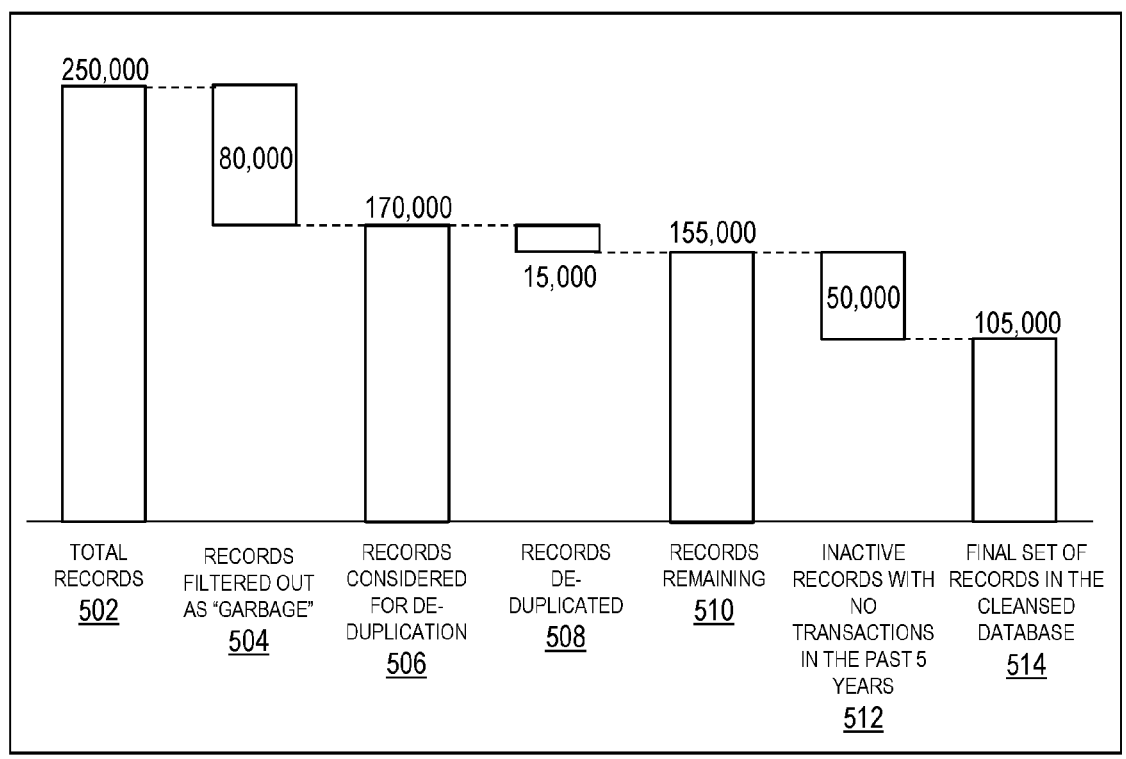
FIG. 5 illustrates a pictorial representation of records removed at each stage while performing the method for cleansing and de-duplicating data, in accordance with an example embodiment.

FIG. 5 illustrates a pictorial representation of records removed at each stage while performing the method for cleansing and de-duplicating data, in accordance with an example embodiment.

At 502, a bar represents a total number of records in a database. For example, it shows '250,000' records. At 504, number of garbage records (junk records) is filtered. In an embodiment, the garbage records are filtered out by the data diagnostic module 202 and the data cleansing module 204.

In another embodiment, the garbage records are filtered out by the processor 404. The numbers of junk records are identified as '80,000'. Thus, the number of records for de-duplication, after removing junk records, is identified by excluding the total number junk records ('80,000') from the total number of records in the database ('250,000'). At 506, the number of records considered for de-duplication is depicted. For example, the number of records considered for de-duplication are '170,000' (i.e. '250,000'–'80,000').

Thereafter, a de-duplication method described in the present description is applied on the records, thereby de-duplicating the duplicate records. At 508, number of records that are de-duplicated is depicted as '15,000'. Thus, the remaining records in the database could be identified by subtracting the number of records that are de-duplicated from the number of records considered for de-duplication. At 510, the remaining records after de-duplication are depicted as '155,000' (i.e. '170,000'–'15000').

Thereafter, a predefined consolidation rule is applied. For example, inactive records are removed from the remaining records, for example the records left after de-duplication. At 512, inactive records with no transactions in the past five (5) years are identified, for example such records are 50,000. At 514, the inactive records are removed from the de-duplicated records and a cleansed database is prepared. Thus, at 514, final set of records in the cleansed and de-duplicated database is depicted as '105,000' (i.e. '155,000'–'50,000').

Machine Execution

Figure 6:
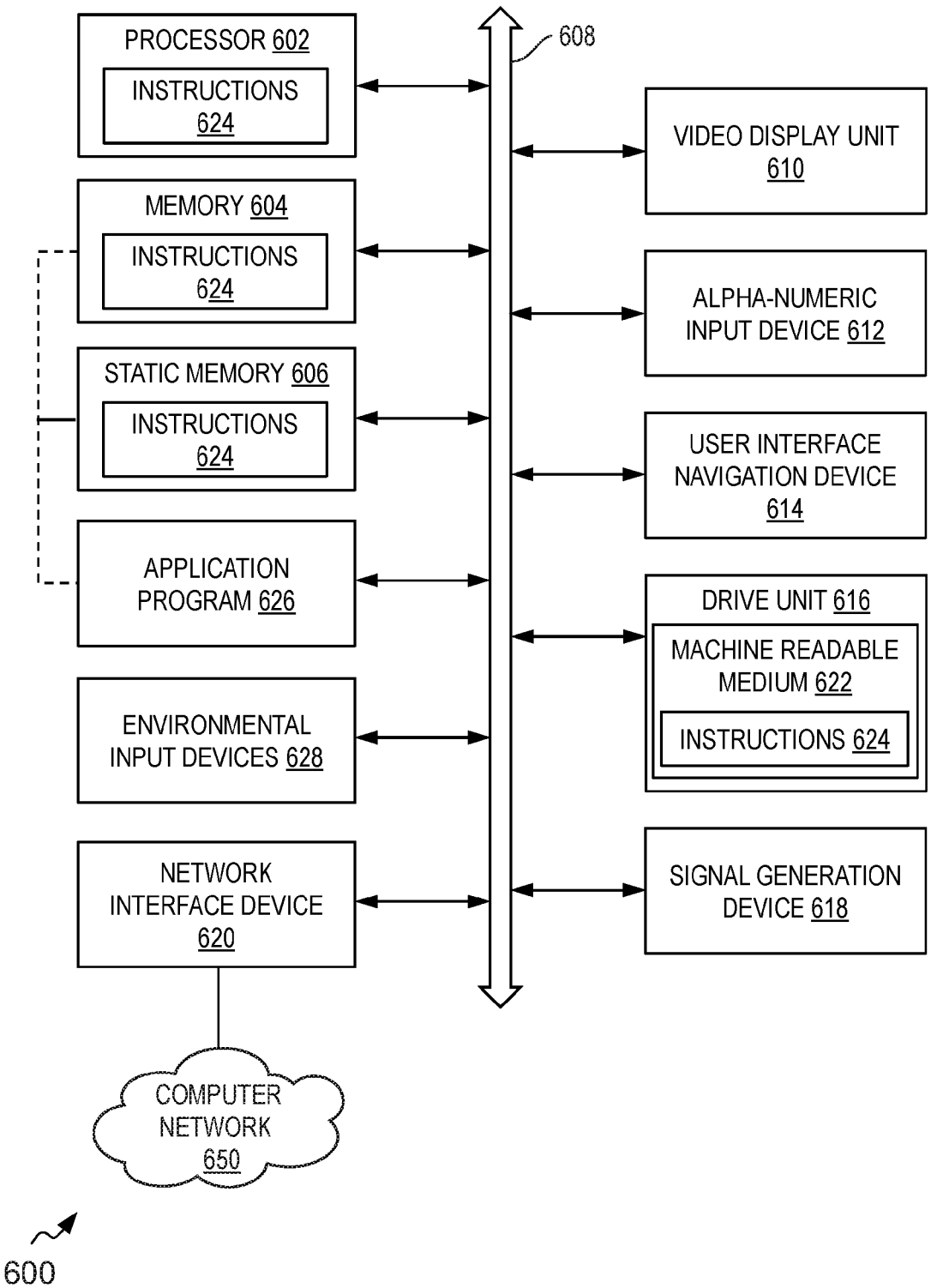
FIG. 6 is a block diagram of a machine in the example form of a computing device within which instructions for causing the machine to perform any one or more of the methodologies discussed herein may be executed, in accordance with an example embodiment.

FIG. 6 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620. The computer system 600 may also include an environmental input device 628 that may provide a number of inputs describing the environment in which the computer system 600 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. In an embodiment, an application program 626 is also executed by the processor 602.

The application program 626 is software (also referred as "Prime Software") that may reside in the memory (604 or 606) or it may be a separate component in the computer system 600. In an embodiment, the application program 626 is a part of different computer system and is associated with the computing system 600 through a computer network, for example the computer network 650. The application program 626 includes instructions that are capable of cleansing and de-duplication of data in a database. The application program 626 is executed by the processor 602. The database is either associated with the computer system 600 or is a part of different computer system. In an embodiment, the application program 626 performs all the function of performed by different modules included in the data cleansing and de-duplicating system 108 (explained in conjunction with FIG. 2).

The application program 626 first filters garbage records from a plurality of records based on data fields. A cleansed database is then created by applying cleansing rules to remove the garbage records. The application program 626 then generates similarity vectors, wherein each vector corresponds to a pairwise comparison of distinct data entries in the cleansed database. Further, the application program 626 applies matching rules to find matched data and unmatched data in the cleansed database for labeling each vector in the similarity vectors as one of matched, unmatched and unclassified.

The application program 626 thereafter analyses the vectors labeled as matched and unmatched to train a machine learning model to identify duplicates in the cleansed database. Further, the application program 626 labels the unclassified vectors in the cleansed database as matched or unmatched by applying the machine learning model on the unclassified vectors. Thereafter, all the vectors labeled as match is processed to create clusters of records that are duplicates of each other in the cleansed database. Subsequently, the application program 626 merges the records in each cluster are to obtain a de-duplicated cleansed database using predefined consolidated rules.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

The instructions 624 may further be transmitted or received over a computer network 650 using a transmission medium. The instructions 624 may be transmitted using the network interface device 620 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its sub-standards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 6. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A computer-implemented method for cleansing and de-duplicating data in a database, the computer-implemented method comprising:

identifying garbage records from a plurality of records in the database based on distinct data entries of data fields from each of the plurality of records;

applying cleansing rules to create a cleansed database by removing the garbage records and standardizing the distinct data entries;

for each pair of records in the cleansed database:

generating a similarity vector using one or more string matching algorithms, wherein the similarity vector corresponds to a pairwise comparison of the pair of records and each dimension of the similarity vector represents a similarity score between distinct data entries of one data field of the distinct records; and labeling the similarity vector as a matched vector, an unmatched vector, or an unclassified vector by applying matching rules to the distinct data entries of the pair of records;

training a machine learning model to identify matched records in the cleansed database by analyzing the labelled similarity vectors labeled as matched vector and unmatched vectors;

applying the machine learning model to the unclassified vectors to label each of the unclassified vectors in the cleansed database as matched vector or unmatched vector;

processing all of the matched vectors in the cleansed database to create clusters of matched records; and merging the matched records in each cluster to obtain a de-duplicated cleansed database using one or more predefined consolidated rules.

2. The computer implemented method of claim 1 further comprising prior to the step of filtering the garbage records, extracting the data fields based on a profiling of data sets in the database, wherein the profiling of data sets includes analyzing at least one of statistical properties of data, format of data, quality of data, quantity of data, and data pattern.

3. The computer implemented method of claim 1, wherein applying cleansing rules comprises standardizing the distinct data entries of the data fields in a predefined format.

4. The computer implemented method of claim 3, wherein standardizing the distinct data entries further comprises performing at least one of converting the distinct data entries to upper case, converting the distinct data entries to lower case, removing special characters from the distinct data entries, arranging the distinct data entries in a predefined pattern, replacing abbreviations within the distinct data entries with expanded text, adding data to the distinct data entries, and removing data to the distinct data entries.

5. The computer implemented method of claim 1, wherein generating the similarity vectors comprises using a Jaro-Winkler string matching algorithm to generate dimensions of the similarity vector.

6. The computer implemented method of claim 1, wherein merging the matched records further comprises identifying a master record in each cluster of matched records.

7. The computer implemented method of claim 1 wherein applying the machine learning model further comprises performing a human assisted analysis of the similarity vector.

8. A system for cleansing and de-duplicating data in a database, the system comprising:

a memory configured to store instructions for cleansing and de-duplicating data; and a processor configured to execute instructions stored in the memory, to cause the system to:

identify garbage records from a plurality of records in the database based on distinct data entries of data fields from each of the plurality of records;

apply cleansing rules to create a cleansed database by removing the garbage records and standardizing the distinct data entries;

for each pair of records in the cleansed database:

generate a similarity vector using one or more string matching algorithms, wherein the similarity vector corresponds to a pairwise comparison of the pair of records and each dimension of the similarity vector represents a similarity score between distinct data entries of one data field of the distinct records; and label the similarity vector as a matched vector, an unmatched vector, or an unclassified vector by applying matching rules to the distinct data entries of the pair of records;

train a machine learning model to identify matched records in the cleansed database by analyzing the labelled similarity vectors labeled as matched vector and unmatched vectors;

apply the machine learning model to the unclassified vectors to label each of the unclassified vectors in the cleansed database as matched vector or unmatched vector;

process all of the matched vectors in the cleansed database to create clusters of matched records; and merge the matched records in each cluster to obtain a de-duplicated cleansed database using one or more predefined consolidated rules.

9. The system of claim 8, wherein the processor is further configured to cause the system to extract the data fields based on a profiling of data sets in the database, wherein the profiling of the data sets includes at least one of statistical properties of data, format of data, quality of data, quantity of data, and data pattern.

10. The system of claim 8, wherein the processor is further configured to cause the system to apply the cleansing rules by standardizing data in the data fields in a predefined format.

11. The system of claim 10, wherein the processor is further configured to cause the system to standardize the distinct data entries by performing at least one of converting the distinct data entries to upper case, converting the distinct data entries to lower case, removing special characters from the distinct data entries, arranging the distinct data entries in a predefined pattern, replacing abbreviations within the distinct data entries with expanded text, adding data to the distinct data entries, and removing data to the distinct data entries.

12. The system of claim 8, wherein the processor is further configured to use a Jara-Winkler string matching algorithm to generate dimensions of the similarity vectors.

13. The system of claim 8, wherein the processor is further configured to identify a master record in each cluster of matched records.

14. The system of claim 8, wherein the processor is further configured to perform a human assisted analysis of each similarity vector to label each similarity vector.

15. The system of claim 8, wherein the merged records are stored in an external database.

16. A computer program product comprising at least one non-transitory computer-readable storage medium, the non-transitory computer-readable storage medium comprising a set of instructions which, when executed by one or more processors of a system, cause the system to:

identify garbage records from a plurality of records in a database based on distinct data entries of data fields from each of the plurality of records;

apply cleansing rules to create a cleansed database by removing the garbage records and standardizing the distinct data entries;

for each pair of records in the cleansed database:

generate a similarity vector using one or more string matching algorithms, wherein the similarity vector corresponds to a pairwise comparison of the pair of records and each dimension of the similarity vector represents a similarity score between distinct data entries of one data field of the distinct records; and label the similarity vector as a matched vector, an unmatched vector, or an unclassified vector by applying matching rules to the distinct data entries of the pair of records;

train a machine learning model to identify matched records in the cleansed database by analyzing the labelled similarity vectors labeled as matched vector and unmatched vectors;

apply the machine learning model to the unclassified vectors to label each of the unclassified vectors in the cleansed database as matched vector or unmatched vector;

process all of the matched vectors in the cleansed database to create clusters of matched records; and merge the matched records in each cluster to obtain a de-duplicated cleansed database using one or more predefined consolidated rules.

\* \* \* \* \*